United States Patent [19]
Holper

[11] 3,866,986

[45] Feb. 18, 1975

[54] RESILIENT SPHEROIDAL BEARING SUPPORTS

[75] Inventor: Frank Holper, Cary, Ill.

[73] Assignee: Original Equipment Motors Inc., Crystal Lake, Ill.

[22] Filed: Oct. 5, 1973

[21] Appl. No.: 404,378

[52] U.S. Cl................ 308/72, 29/149.5 B, 308/29, 308/194

[51] Int. Cl.... F16c 23/04, F16c 23/10, F16c 27/06

[58] Field of Search......... 308/72, 29, 30, 132, 194; 29/149.5 B

[56] References Cited
UNITED STATES PATENTS
2,621,088   12/1952   Cole..................................... 308/72

Primary Examiner—Lloyd L. King
Assistant Examiner—Howard Beltran
Attorney, Agent, or Firm—Kinzer, Plyer, Dorn & McEachran

[57] ABSTRACT

A motor shaft bearing of spheroidal form is resiliently supported and retained by a plate of spring metal having an opening with a sloped wall bent therefrom presenting opposed sides which tangentially engage opposed points on the bearing surface.

6 Claims, 9 Drawing Figures

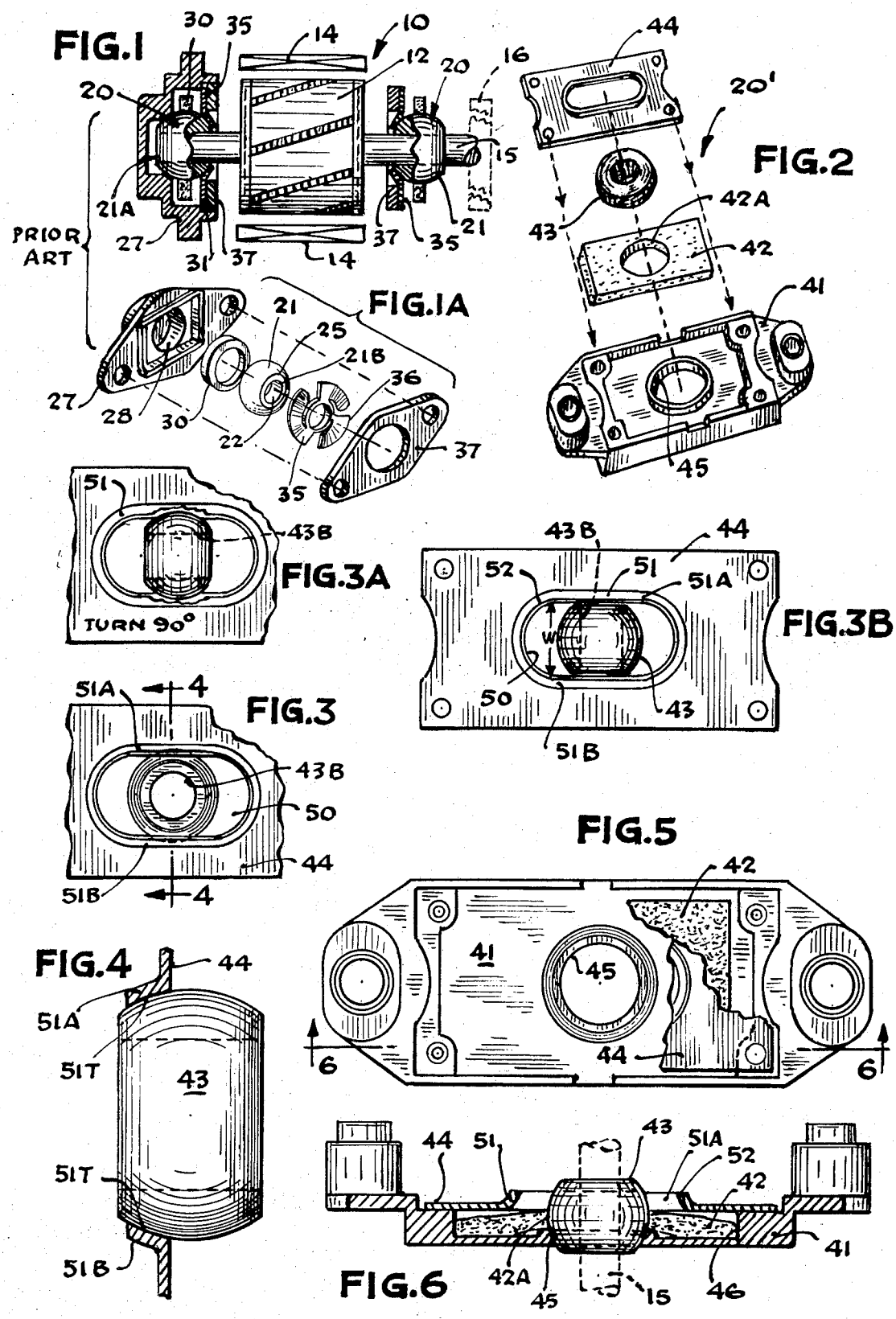

RESILIENT SPHEROIDAL BEARING SUPPORTS

This invention relates to self-aligning bearings and in particular those used to support the rotor shaft of an electric motor. The preferred embodiment of the invention is disclosed in relation to an electric motor of small, sub-fractional horse power, but it will be appreciated that this form is only representative of utility.

A highly competitive market exists for small electric motors of fractionally small horse power. The elimination of a part or any increase in productivity for motor assembly may play a significant role in cost reduction. The primary object of the present invention is to eliminate certain parts and reduce the time required for assembly of an electric motor by simplifying the bearing support means for the rotor shaft, and of course the same objective would be applicable to similar bearing supported shafts. More specifically, under the present invention, it is an object to combine the features of a separate retaining spring and a separate retainer plate for a spheroidal bearing, the two being combined in one part with consequent cost reduction and productivity increase.

Other and further objects of the present invention will be apparent from the following description and claims and are illustrated in the accompanying drawing which, by way of illustration, shows a preferred embodiment of the present invention and the principle thereof and what is now considered to be the best mode contemplated for applying this principle. Other embodiments of the invention embodying the same or equivalent principles may be made as desired by those skilled in the art without departing from the present invention.

In the drawing:

FIG. 1 is a sectional view, partly schematic, of an electric motor having a rotor shaft supported by known bearing means;

FIG. 1A is an exploded view of a known bearing means;

FIG. 2 is an exploded view showing a bearing means constructed in accordance with the present invention;

FIGS. 3, 3A and 3B are detail views showing stages of bearing disassembly under the present invention;

FIG. 4 is a sectional view, enlarged, on the line 4—4 of FIG. 3;

FIG. 5 is a plan view of the bearing support with certain related parts fragmented; and FIG. 6 is a sectional view on the line 6—6 of FIG. 5.

Referring to FIGS. 1 and 1A, an electric motor 10 of fractionally small horse power, of known construction, is shown as comprising a rotor (armature) 12 and an associated coil or field winding 14. The rotor is secured to a rotor shaft 15 which may drive a gear 16.

The rotor shaft is supported for rotation in a pair of bearing means 20 of identical form, the bearing means including a spheroidal bearing 21 having an axial bearing bore 22 and a truncated spherical bearing surface 25. Thus, each of the spherical bearings has a flat end 21A and 21B.

A bearing support member 27 is provided with a conical seat 28, receiving one of the spheroidal bearings 21.

The bearing is advantageously of porous bronze metal (compacted and sintered bronze powder) impregnated with a lubricant. As further assurance to sustained lubricity, a felt washer 30 impregnated with lubricant is located in a recess 31 presented by the bearing support member, the washer embracing the spherical surface of the bearing.

In the known arrangement, FIGS. 1 and 1A, the bearing is held against displacement by a washer-type spring 35, having three spring fingers 36 contoured to engage the end of the bearing opposite the end disposed in the conical seat 28. The spring is retained by a retainer plate 37 which may be staked or otherwise fastened to the bearing support member 27.

It will be appreciated from what has been explained in connection with the known structure that the spring 35 and the retainer plate 37 are separate elements to be handled during assembly. The felt washer 30 is of limited capacity inasmuch as its diameter should exceed the diameter of spring 35. Under the present invention the spring 35 and retainer 37 are uniquely combined into a single retainer element and a felt lubricator of greatly enlarged capacity compared to element 30 may be utilized.

Thus, referring to FIG. 2, bearing means 20', replacing the bearing means 20 described above, comprises only four elements, namely a support member 41, a felt strip 42, a spheroidal bearing 43 (in the form already described) and a combined spring and retainer plate 44 of spring brass. It may not always be necessary to utilize a lubricating felt strip as 42, depending upon performance requirements, but in those instances where assurance for sustained lubricity is a performance requirement, it may be noted that since the spring-retainer member 44 is rectangular the felt strip is permissibly rectangular and hence of enlarged capacity compared to the limited capacity of the felt washer 30, FIG. 1A.

As in the known arrangement, the support or housing member 41 is provided with a conical seat 45, FIGS. 2, 5 and 6, for receiving one end of the bearing, and as best shown in FIG. 6, the felt insert, representing a reservoir of lubricant, is neatly confined in a rectangular recess 46 within the support 41, the felt strip having an aperture 42A which snugly embraces the outer periphery of the spheroidal bearing so that the lubricant may be relayed thereto.

The brass spring plate 44 is formed in the medial area thereof with an oval-shaped opening 50, FIG. 3, and the metal surrounding the opening 50 is bent or extruded outwardly to form a collar-like wall 51, having a continuous oval-shaped free edge 52. As shown in FIG. 4 opposite sides of the wall 51 are sloped toward one another in convergent relation, 51A and 51B, proceeding outwardly of the plane of the opening 50, a relationship which prevails around the entire circumference of the opening 50 as will be readily apparent from FIG. 3. Thus, in cross section, FIG. 6, the wall 51 is of trapezoidal shape on the major axis of the opening 50; this is equally true when viewed on the minor axis, FIG. 4. In fact, the wall 51 is uniform in that the sides 51A and 51B are parallel and the ends are semi-circular with an equal radius of curvature, substantially so.

As shown in FIG. 3B, the distance W separating the parallel sides of the free edge 52 is of less dimension than the diameter of the spherical surface of the bearing 43. The dimension W is, however, not less than the axial dimension of the bearing bore 43B. Consequently, as shown in FIG. 3, the spheroidal bearing may be captured in the opening 50 with the flat ends thereof parallel to the free edges of the opposed sidewalls 51A and 51B; or viewed another way, the bearing bore 43B is normal to the minor axis of the opening 50.

What is shown in FIG. 3 may be viewed as the inserted position. For disassembly, the bearing 43 may be rotated so that the bore is displaced 90° to the position shown in FIG. 3A where the bearing bore 43B is parallel to the major axis of the opening 50. In such position, the spherical sides of the bearing are still captured by the sloped walls 51A and 51B. Then, the bearing may be turned 90° in a second direction to the position shown in FIG. 3B where the axis of the bearing bore 43B is disposed normal to the major axis of the spring plate opening, enabling the bearing to be lifted freely from the bearing plate opening. A new bearing may be replaced by the reverse procedure.

It will be seen from what has been explained in connection with FIGS. 3, 3A and 3B that the retainer plate 44 may be staked or otherwise secured to the support member 41 after first emplacing the felt strip 42 and then the bearing 43, FIG. 2. This assembly procedure is to be compared to what is required for the known arrangement, FIGS. 1 and 1A, where the felt washer must first be emplaced, the bearing next seated, the spring 35 then located and held by the index finger and finally the retainer 37 juxtaposed thereon and fastened down. Thus, under the present invention, a part is not only eliminated with consequent savings in cost, but assembly is simplified in that there is no separate spring element as 35 and separate retainer element as 37 requiring dexterity for positioning and fastening.

The dimensioning is such that walls 51A and 51B exert a slight amount of compressive force on the bearing in its operative position, FIG. 6. This may be achieved in different ways: by a slight bow in the plate, by a slight bend in the side walls 51A and 51B and in other ways, characterizing a unique feature of the invention in that the opposed sidewalls 51A and 51B, FIGS. 3B and 4, constitute opposed torsion springs engaging the bearing tangentially at only two points 51T, FIG. 4. Thus it will be realized that when bearing means 20' of the present invention are substituted for the known bearing means as 20, FIG. 1, the two spheroidal bearings are in effect suspended for alignment to the shaft 15 by torsion springs of considerable length in view of the oval configuration of wall 51.

In the known arrangement, FIG. 1, the spring design is such that the pressure, however slight, holding the bearing in the seat is applied at more than two points; and in some of the known arrangements a single spring element engages the bearing in a full 360° line; contact similar to the bearing seat itself. In any event, it is now evident that as the number of points of spring contact increase, there is a proportional increase in resistance of the bearing (two bearings; two spring means; one shaft) to undergo alignment with canting of the shaft, as 15, if there is canting. Also, with short spring fingers, FIG. 1, variations in spring rate are bound to be presented. In comparison, the spring element 44 of the present invention has, in reality, two long spring arms 51A and 51B engaging the bearing at two opposing points only, the arms readily adjusting to one another and to shaft alignment as if the arms 51A and 51B were combined in a single torsion bar. As a consequence, since the spring may be viewed as a torsion bar having a two-point contact with the bearing, there is a greater degree of tolerance when mating the spring 44 to the bearing; that is, more mislocation is permissible compared to the spring of the prior art where true concentricity is almost essential to assure that the bearing is evenly loaded by spring pressure.

The preferred construction is one wherein elements 35 and 37, FIG. 1, associated with each bearing, are supplanted by the spring plate 44.

I claim:

1. A spring retainer for a bearing having an axial bore and a spherical surface and comprising a plate of spring metal having an elongated oval-shaped opening formed in the plane thereof, the metal surrounding said opening being bent outwardly to present a continuous collar-like wall having opposite sides convergent toward one another outwardly of said opening, said wall having a free edge and the spaced portions of said free edge corresponding to said opposite sides being substantially parallel to one another and spaced from one another a distance sufficient to enable the bearing to be disposed therein with the spherical surface of the bearing captured by the convergent sides of said wall.

2. A retainer according to claim 1 in combination with a support member having a conical seat in which is set one end of the bearing, the retainer plate being fastened to said support member in spaced relation to said seat, and a rectangular strip of porous material disposed in the space between the seat and plate, said strip having an aperture surrounding the spheroidal surface of the bearing and being impregnated with lubricant for the bearing.

3. The combination of claim 2 wherein the retainer plate is fastened to said support member in spaced relation to said seat, and a rectangular strip of porous material disposed in the space between the seat and plate, said strip having an aperture surrounding the spheroidal surface of the bearing and being impregnated with lubricant for the bearing.

4. In an electric motor where a rotor is mounted on a shaft, a self-aligning bearing means for supporting the shaft and comprising: a bearing having a spherical surface, a support member affording a seat for one end of the bearing, and a retainer plate engaged with the opposite end of the bearing, said retainer plate being of spring metal and having an oval-shaped opening therein, the metal of the plate surrounding said opening being bent outwardly of said opening to define a continuous wall having substantially parallel sides, said sides being bent inwardly toward one another, and said bearing being confined between and by said inwardly bent sides of said wall engaging said bearing substantially tangentially at two opposed points on the spherical surface thereof.

5. An electric motor according to claim 3 wherein the bearing is of porous metal, wherein the retainer plate is rectangular, and a rectangular strip of porous material impregnated with a lubricant and interposed between the support member and the retainer plate, said strip having an opening embracing the periphery of the bearing.

6. The combination of a bearing having a spherical surface and a shaft-supporting bore, a support member having a seat for one end of the bearing and a retainer for holding the bearing in said seat, said retainer being a plate of spring metal with a substantially oval-shaped opening therein, the opening having a continuous oval-shaped wall bent therefrom with opposite sides of said wall parallel to the major axis of the opening tangentially engaging the spherical surface of the bearing.

* * * * *